(12) United States Patent
Ha (10) Patent No.: US 11,075,662 B2
(45) Date of Patent: Jul. 27, 2021

(54) RADIATION PROTECTOR FOR MOBILE DEVICES

(71) Applicant: Duong Huy Ha, Santa Monica, CA (US)

(72) Inventor: Duong Huy Ha, Santa Monica, CA (US)

( * ) Notice: Subject to any disclaimer, the term of this patent is extended or adjusted under 35 U.S.C. 154(b) by 207 days.

(21) Appl. No.: 15/070,875

(22) Filed: Mar. 15, 2016

(65) Prior Publication Data

US 2016/0197632 A1 Jul. 7, 2016

Related U.S. Application Data

(63) Continuation-in-part of application No. 13/672,695, filed on Nov. 8, 2012, which is a continuation-in-part of application No. 13/668,284, filed on Nov. 4, 2012.

(60) Provisional application No. 61/585,600, filed on Jan. 11, 2012, provisional application No. 61/560,490, filed on Nov. 16, 2011.

(51) Int. Cl.
| | |
|---|---|
| *H04B 1/3888* | (2015.01) |
| *H04B 1/3827* | (2015.01) |
| *H01Q 1/52* | (2006.01) |
| *H04M 1/18* | (2006.01) |

(52) U.S. Cl.
CPC ........... *H04B 1/3838* (2013.01); *H01Q 1/526* (2013.01); *H04B 1/3888* (2013.01); *H04M 1/185* (2013.01)

(58) Field of Classification Search
CPC . A45C 11/00; A45C 11/182; A45C 2011/002; A45C 2200/15; H04B 1/3888; H04B 1/3838; H01Q 1/526; H04M 1/185
See application file for complete search history.

(56) References Cited

U.S. PATENT DOCUMENTS

| | | | | |
|---|---|---|---|---|
| 5,657,386 A | * | 8/1997 | Schwanke | H01Q 1/245 361/814 |
| 6,711,387 B1 | * | 3/2004 | Lungley | H04B 1/3838 455/117 |
| 2003/0069807 A1 | * | 4/2003 | Lyden | A43B 1/0081 705/26.5 |
| 2004/0020674 A1 | * | 2/2004 | McFadden | H05K 9/0088 174/394 |
| 2011/0032171 A1 | * | 2/2011 | Tuttle | H01Q 1/2216 343/876 |
| 2011/0098090 A1 | * | 4/2011 | Parienti | H04B 1/3838 455/566 |
| 2013/0157729 A1 | * | 6/2013 | Tabe | H04W 52/0245 455/573 |

(Continued)

*Primary Examiner* — Lester G Kincaid
*Assistant Examiner* — Dung L Lam
(74) *Attorney, Agent, or Firm* — Eandi Fitzpatrick LLP (57) ABSTRACT

A radiation protector is disclosed for protecting against radiation having a wavelength, which may include a front panel portion that includes a flexible carbon fiber layer having an outer edge and a back panel portion that includes a base layer mobile device having an outer edge. The outer edges of each of the flexible carbon fiber layer and base layer extend from edges of an electronic device having an antenna and removably positioned within a device housing on the base layer by a width w, wherein the width w is a fraction of a the wavelength of the radiation emitted by the antenna, and wherein the width w is between 0.5 and 2.5 centimeters from each of front, back, top and bottom sides of the electronic device.

4 Claims, 6 Drawing Sheets

(56) References Cited

U.S. PATENT DOCUMENTS

2014/0370944 A1* 12/2014 Green ................... G06F 1/1626
455/575.1

* cited by examiner

Summary Of SAR Test Results - Head Phantom

| SAR Measurement Results At The Head - GPRS 2 Slot Tx Configuration ||||||||||
|---|---|---|---|---|---|---|---|---|---|
| | | | | Baseline Iphone 5C || Iphone 5C With Plastic Shell || Iphone 5C With Plastic Shell And Cover ||
| Position | Channel | Frequency (MHz) | Band | Measured SAR 1g (W/kg) | Measured SAR 10g (W/kg) | Measured SAR 1g (W/kg) | Measured SAR 10g (W/kg) | Measured SAR 1g (W/kg) | Measured SAR 10g (W/kg) |
| Right Ear Touch | 190 | 836.60 | Cell | 0.69 | 0.51 | 0.65 | 0.48 | 0.04 | 0.03 |
| Right Ear Tilt | 190 | 836.60 | Cell | 0.41 | 0.31 | 0.33 | 0.25 | 0.03 | 0.02 |
| Left Ear Touch | 190 | 836.60 | Cell | 0.76 | 0.55 | 0.77 | 0.57 | 0.04 | 0.03 |
| Left Ear Tilt | 190 | 836.60 | Cell | 0.37 | 0.28 | 0.34 | 0.25 | 0.02 | 0.02 |
| Right Ear Touch | 661 | 1880.00 | PCS | 1.01 | 0.63 | 0.51 | 0.33 | 0.06 | 0.03 |
| Right Ear Tilt | 661 | 1880.00 | PCS | 0.33 | 0.21 | 0.27 | 0.17 | 0.07 | 0.04 |
| Left Ear Touch | 661 | 1880.00 | PCS | 0.62 | 0.41 | 0.56 | 0.24 | 0.05 | 0.03 |
| Left Ear Tilt | 661 | 1880.00 | PCS | 0.27 | 0.22 | 0.29 | 0.18 | 0.08 | 0.05 |

Summary Of SAR Test Results - Body Phantom

| SAR Measurement Results At The Head - GPRS 2 Slot Tx Configuration |||||||||||
|---|---|---|---|---|---|---|---|---|---|---|
| | | | | | Baseline Iphone 5C || Iphone 5C With Plastic Shell || Iphone 5C With Plastic Shell And Cover ||
| Position | Channel | Frequency (MHz) | Band | Separation Distance (mm) | Measured SAR 1g (W/kg) | Measured SAR 10g (W/kg) | Measured SAR 1g (W/kg) | Measured SAR 10g (W/kg) | Measured SAR 1g (W/kg) | Measured SAR 10g (W/kg) |
| Display Facing Phantom | 190 | 836.0 | Cell | 5 | 0.91 | 0.70 | 0.74 | 0.56 | 0.03 | 0.02 |
| Display Away From Phantom | 190 | 836.0 | Cell | 5 | 1.03 | 0.75 | 1.05 | 0.71 | 0.60 | 0.43 |
| Display Facing Phantom | 661 | 1880.00 | PCS | 5 | 1.65 | 1.01 | 0.66 | 0.42 | 0.04 | 0.03 |
| Display Away From Phantom | 661 | 1880.00 | PCS | 5 | 1.21 | 0.59 | 0.57 | 0.29 | 0.41 | 0.25 |

RADIATION PROTECTOR FOR MOBILE DEVICES

CROSS-REFERENCE TO RELATED APPLICATIONS

This application is a continuation-in-part of U.S. application Ser. No. 13/672,695 entitled "Radiation Protector For Mobile Devices", filed on Nov. 8, 2012, which is also a continuation-in-part of U.S. application Ser. No. 13/668,284 entitled "Radiation Protector For Mobile Devices", filed on Nov. 4, 2012, which is a non-provisional of Provisional Application Ser. No. 61/585,600, entitled "Hood and Garment That Protects Against Cellular Phone and Microwave Energy", filed on Jan. 11, 2012, and is a non-provisional of Provisional Application Ser. No. 61/560,490, entitled "Fabric That Protects Against Cellular Phone Energy", filed on Nov. 16, 2011, and claims priority from those applications and incorporates them by reference.

FIELD OF THE INVENTION

The present invention generally relates to a radiation protector for mobile devices and the like. More specifically, the invention relates to a radiation protector that may be customized to the wavelength of an electronic device emitting potentially harmful radiation to provide maximum protection.

BACKGROUND OF THE INVENTION

Cell phones and other mobile devices are extremely prevalent nowadays, being used not only for communications but also for entertainment purposes. However, the effect of mobile phone radiation on human health is the subject of recent interest and study, as a result of the enormous increase in mobile phone usage throughout the world (as of November 2011, there were more than 5.981 billion subscriptions worldwide). Mobile phones use electromagnetic radiation in the microwave range. Other digital wireless systems, such as data communication networks, produce similar radiation. It is noted that the electromagnetic radiation is a non-ionizing radiation as well as sunlight, however, both of them can cause cancer.

The World Health Organization (WHO) has classified mobile phone radiation on the International Agency for Cancer Research (IARC) scale into Group 2B—possibly carcinogenic. That means that there could be some risk of carcinogenicity, so additional research into the long-term, heavy use of mobile phones needs to be conducted. Some national radiation advisory authorities have recommended measures to minimize exposure to their citizens as a precautionary approach.

In February 2009, the telecom company Bouygues Telecom was ordered to take down a mobile phone mast due to uncertainty about its effect on health. Residents in the commune Charbonnieres in the Rhône department had sued the company claiming adverse health effects from the radiation emitted by the 19 meter tall antenna. The milestone ruling by the Versailles Court of Appeal reversed the burden of proof which is usual in such cases by emphasizing the extreme divergence between different countries in assessing safe limits for such radiation. The court stated, considering that, while the reality of the risk remains hypothetical, it becomes clear from reading the contributions and scientific publications produced in debate and the divergent legislative positions taken in various countries, that uncertainty over the harmlessness of exposure to the waves emitted by relay antennas persists and can be considered serious and reasonable.

In October 2012, Italian high court (Corte suprema di cassazione) granted an Italian businessman, Innocente Marcoloni a pension for occupational disease, as they found a causal link with his benign brain tumor to mobile phones and cordless phones, that the businessman had used for six hours a day during twelve years. As it takes time to develop cancer, the court disregarded short-term studies. The Court also disregarded studies that were even partially funded by the mobile phone industry such as the INTERPHONE.

To counter the effects of this harmful radiation, metallic shields have been developed. Unfortunately, these metallic shields alone are insufficient to absorb the harmful radiation emitted by these electronic devices to the point where it would not harm the body. Therefore, there is still a need for a shield that can absorb the harmful radiation emitted by these mobile devices to allow users to use these devices without harm.

SUMMARY OF THE INVENTION

It is an object of the present invention to provide a radiation protector for mobile devices that can substantially reduce the radiation emitted by the mobile devices.

It is another object of the present invention to provide a "book style" radiation protector for mobile devices, wherein the mobile device can be disposed on one side of the inner portion of the protector, and a shielding unit can be disposed on the other side thereof.

In another aspect, a radiation protector for mobile devices may include a mobile device housing and an inner surface having a first side and a second side. In one embodiment, the first side and second side are arranged in a horizontal manner, and the size of the first side and second side are substantially similar. The mobile device housing is disposed on a first side and a radiation shielding unit is disposed on the second side. In another embodiment, the inner surface and an outer surface can be made by leather, rubber, and/or the combination thereof, and the thickness of the protector is about 1 to 3 centimeters.

In another embodiment, the radiation shielding unit is disposed to cover almost the entire second side, and the mobile device housing is disposed in a predetermined position on the first side, wherein a predetermined distance between an outer edge of the device housing and an outer edge of the first side is w, a predetermined distance between a top edge of the device housing and a top edge of the first side is w1, a predetermined distance between a bottom edge of the device housing and a bottom edge of the first side is w2, and a predetermined distance between an inner edge of the device housing and an inner edge of the first side is w3. In a preferred embodiment, the predetermined distances w, w1, w2 and w3 are between 0.5 cm to 2.5 cm

BRIEF DESCRIPTION OF THE DRAWINGS

FIG. 3 illustrates testing results of the radiation protector for mobile devices in the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
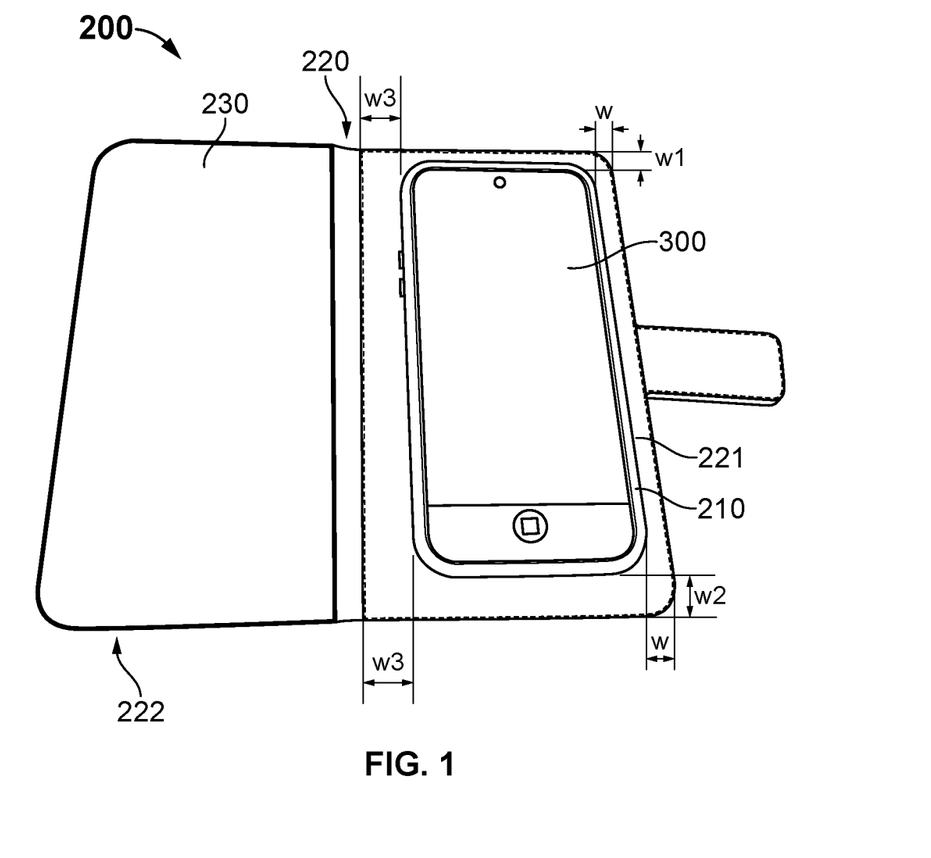
FIG. 1 illustrates a schematic view of the radiation protector for mobile devices in the present invention.

Broadly, embodiments of the present invention generally provide a radiation protector for mobile devices and the like. With reference to FIG. 1, a diagrammatic view of a radiation protector for mobile devices 200 that protects against cellular phone energy according to one embodiment is shown. The radiation protector 200 may be used to shield microwave energy transmitted to and from a portable electronic device such as a cell phone, other sources of radiation (e.g. sunlight, microwave ovens, etc.), or the like, so the user may make or receive calls without having to worry about radiation exposure to the body, eyes, or brain.

Figure 2:
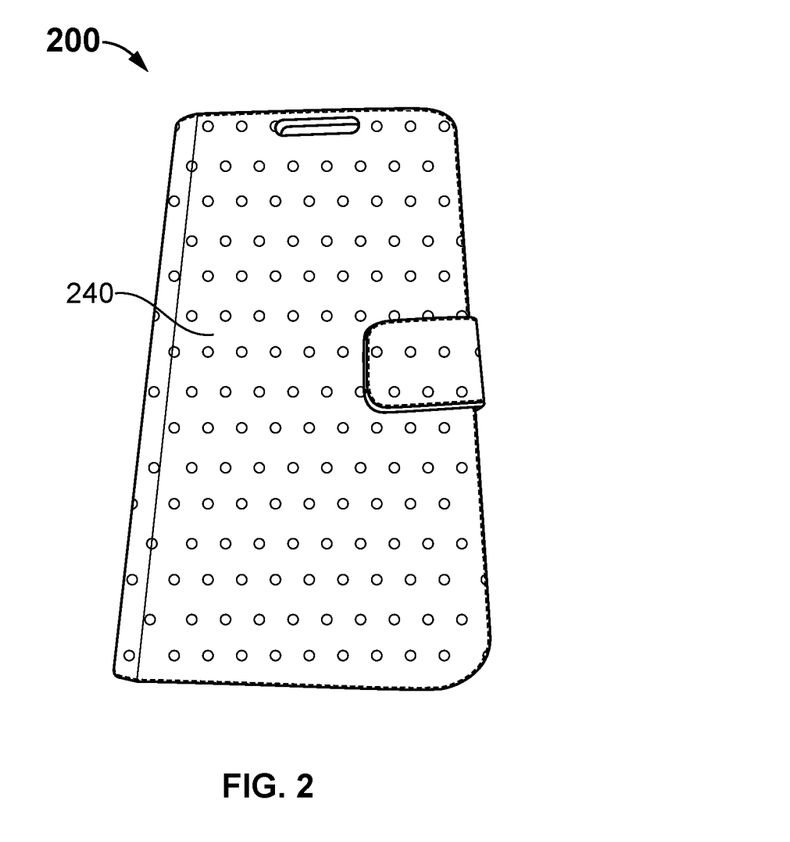
FIG. 2 illustrates a schematic view of the radiation protector for mobile devices when it is folded in the present invention.

In one aspect, the radiation protector for mobile devices 200 may include a mobile device housing 210 and an inner surface 220 having a first side 221 and a second side 222. In one embodiment, the first side 221 and second side 222 are arranged in a horizontal manner, and the size of the first side 221 and second side 222 are substantially similar. The mobile device housing 210 is disposed on a first side 221 and a radiation shielding unit 230 is disposed on the second side 222, as shown in FIG. 1. In another embodiment, the inner surface 220 and an outer surface 240 (see FIG. 2) can be made by leather, rubber, and/or the combination thereof, and the thickness of the protector is about 1 to 3 centimeters.

Still referring to FIG. 1, in another embodiment, the radiation shielding unit 230 is disposed to cover almost the entire second side 222, and the mobile device housing 210 is disposed in a predetermined position on the first side 221, wherein a predetermined distance between an outer edge of the device housing 210 and an outer edge of the first side 221 is w, a predetermined distance between a top edge of the device housing 210 and a top edge of the first side 221 is w1, a predetermined distance between a bottom edge of the device housing 210 and a bottom edge of the first side 221 is w2, and a predetermined distance between an inner edge of the device housing 210 and an inner edge of the first side 221 is w3. In one embodiment, width (w, w1, w2, w3) may relate to the wavelength of signals of the mobile device being used. For example, mobile phones make use of various bands of radio frequencies to communicate between the mobile phone to a base station for a cell and the base station to mobile phone. In a preferred embodiment, the predetermined distances w, w1, w2 and w3 are between 0.5 cm to 2.5 cm, which can be derived and illustrated as following:

It is known that microwaves in activated mobile phones travel in the air almost at the speed of light. The relationship between the wavelength, the speed of light and the frequency follows the well-known formula:

Wavelength ($\lambda$)=Speed of Light($C$)/Frequency

The speed of light (C)=$3 \times 10^{10}$ cm/sec

The common frequency for cell phone here in the U.S.=1.9 to 2.1 GHz

So, the wavelength ($\lambda$) is between 14.3 cm and 15.8 cm.

The electromagnetic energy is conducted by antennas, and it travels back and forth in any moment during wireless communication. Thus, the ideal length of an antenna is half of the wavelength by which it transmits. In a mobile phone, there are at least two antennas, so in order to effectively absorb the microwave of the mobile phone, the radiation protector has to comply with the following equation:

$$D_{AR}=WL/2^3$$

wherein $D_{AR}$ is an effective distance to absorb radiation, WL is wavelength.

As discussed above, the wavelength of the electromagnetic wave of the mobile phone is about 15 cm, so the effective length to absorb radiation is about 15 cm/$2^3$, which equals 1.875 cm and falls within the range between 0.5 and 2.5 cm.

Figure 1A:
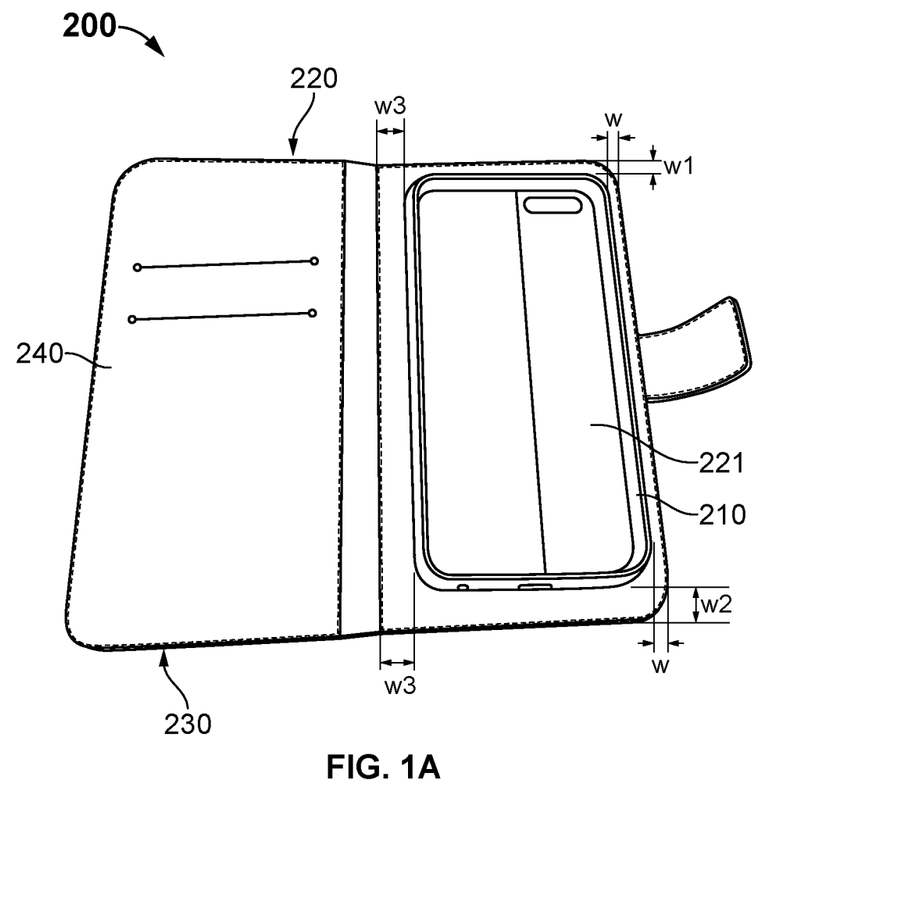
FIG. 1a illustrates a schematic view of one embodiment of the radiation protector for mobile devices in the present invention.

In a further embodiment, the radiation shielding unit 230 is made by high pressure compressed carbon fiber leather, which may have a weight of 220 g/m$^2$. The carbon fiber is like graphite, composed of "organic polymers," which may be made by long strings of molecules bound together by carbon atoms with heat treatment at more than 2200° C., and then integrated into the leather composite with high pressure. In one embodiment, the radiation shielding unit 230 may include 3000 carbon fiber filaments per yarn. In another embodiment as shown in FIG. 1a, the radiation shielding unit 230 can be inserted between two leather layers 240.

When in use, the radiation protector 200 can be folded as a book, so the outer surface 240 with the radiation shielding unit 230 can be disposed on top of the mobile device. When the phone call comes in, the user can accept the call and then put the outer surface 240 back to the top. It is important to note that when the protector 200 is folded, the size of the folded outer surface 240 is still 0.5 to 2.5 cm larger than the device housing 210 on four sides thereof, so that the radiation can be substantially reduced when the mobile device is in use.

FIG. 3 shows a testing result of the radiation shielding effect of the radiation protector 200 in the present invention. The testing was conducted with an iphone 5C and the testing in three situations: the phone only ("Baseline iphone 5C"), the phone with a regular case ("iphone 5C with plastic shell"), and the phone with the protector in the present invention ("iphone 5C with plastic shell and cover"). According to the American and international government testing standard, the testing result shows that the radiation can be effectively shielded by about 90%.

Figure 4:
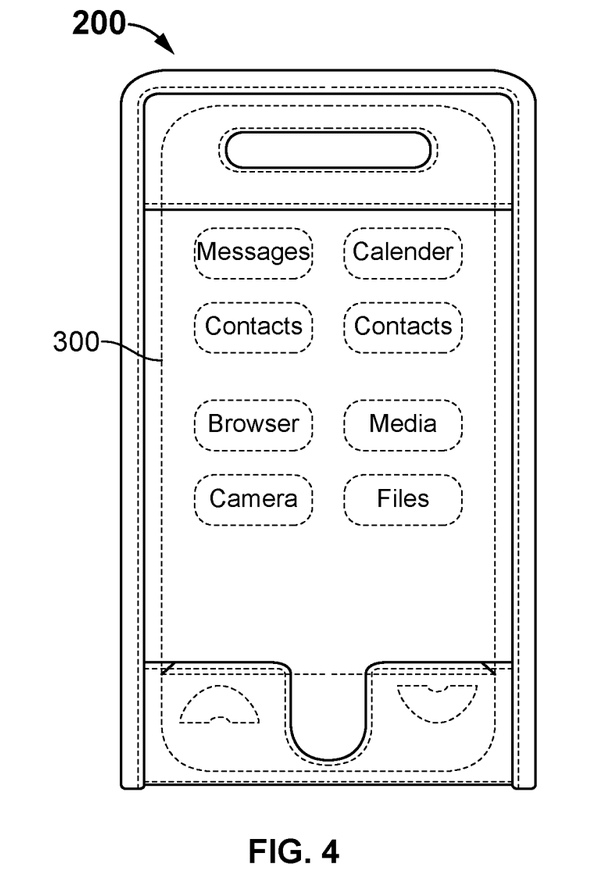
FIG. 4 is a front elevational view of the exemplary radiation protector of FIG. 1 with a mobile phone shown inserted.
Figure 5:
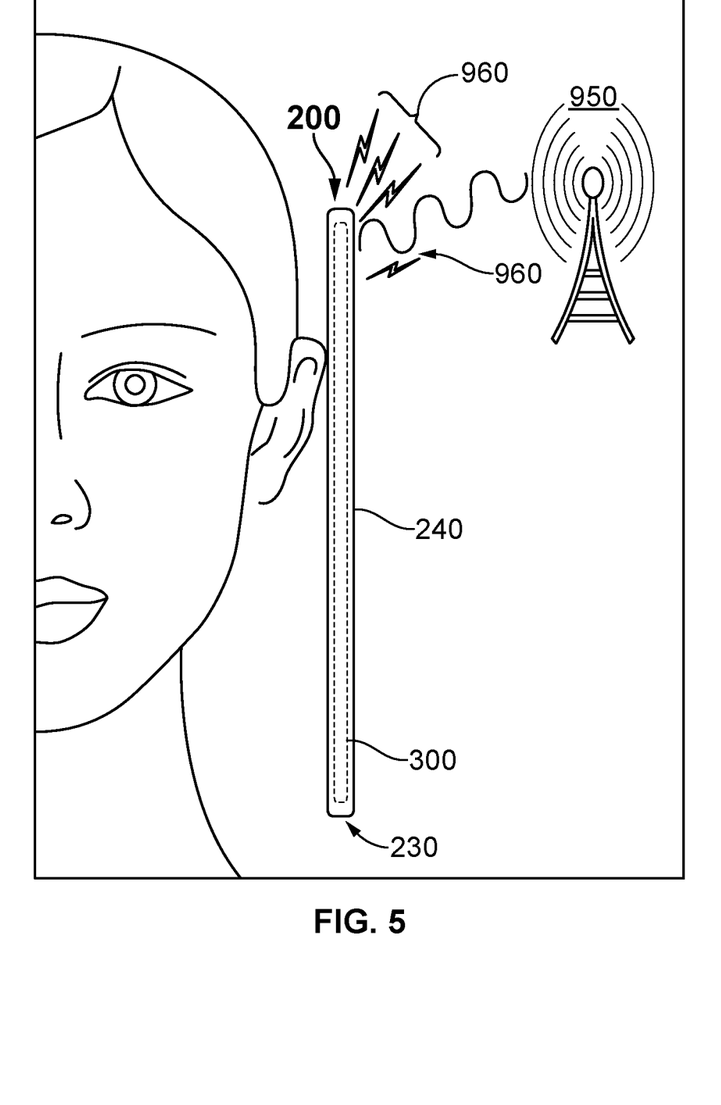
FIG. 5 is diagrammatic side devotional view of the radiation protector with the mobile phone inserted according the embodiment of FIG. 4.

With reference to FIG. 4, a front elevational view of the exemplary radiation protector of FIG. 1 is shown with a mobile phone 300 inserted and the protector is folded as a book. With reference to FIG. 5, a diagrammatic side elevational view of the radiation protector 200 with the mobile phone 300 inserted therein. Also shown in FIG. 5 is an exemplary mobile tower 950 with which the mobile device 300 communicates giving off electromagnetic radiation 960.

As shown in FIG. 5, in the embodiment shown, the front side of the holder that is primarily of radiation shielding unit 230 within the outer cover 240 is configured at a height that may be higher (or longer) than the height of the phone 300. As shown, this may allow for the signals between at least the top portion of the mobile phone 300 and the tower 950 to freely travel. An added benefit to this configuration takes advantage of the typical path of electromagnetic radiation 960 from a mobile device 300, which usually occurs in a perpendicular direction of the path to the user's head, while the sound waves from the phone 300 typically have a parallel course with respect to the user's head and ears. Thus, the electromagnetic radiation 960 can absorbed more effectively by the radiation shielding unit 230 with the width (w, w1, w2, w3) surrounding the phone 300. What is also advantages to the this configuration is the fact that many cell phones have internal antennas in the top portion of the phone 300 where the phone 300 may be exposed from the protector 200, thereby enhancing reception for the phone 300.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. An apparatus for holding an electronic device and protecting users from radiation exposure, said radiation having a wavelength, comprising:
   a front panel portion that includes a radiation shielding flexible carbon fiber layer having an outer edge;
   a back panel portion that includes a base layer having an outer edge; and
   a device housing positioned on the back panel base layer,
       wherein the outer edges of each of the flexible carbon fiber layer and base layer extend from edges of the device housing by a width w and an electronic device having an antenna, wherein the electronic device is removably positioned within the device housing,
       wherein the width w is a fraction of a the wavelength of the radiation emitted by the antenna, and the width w is between 1.7 and 2.0 centimeters from each of front, back, top and bottom sides of the electronic device, and
       wherein the width w is at least ⅛th of the wavelength of the radiation emitted by the electronic device.

2. The apparatus of claim 1, wherein flexible carbon fiber layer is made by high pressure compressed carbon fiber leather, having a weight of 220 g/m2.

3. The apparatus of claim 1, wherein the front panel portion and back panel portion are arranged as a book, so the front panel portion is configured to fold on top of the back panel portion.

4. The apparatus of claim 1, wherein the width w is a fraction of a the wavelength of the radiation emitted by the antenna, and the width w is 1.875 centimeters from each of front, back, top and bottom sides of the electronic device.

* * * * *